(12) United States Patent
Brisebois et al.

(10) Patent No.: US 7,486,628 B1
(45) Date of Patent: Feb. 3, 2009

(54) WIRELESS NETWORK COMMUNICATIONS

(75) Inventors: Mitch A. Brisebois, Gloucester (CA);
Paul Douglas McDonald, Nepean (CA);
Susan Kathleen Coleman, Aylmer (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/466,124

(22) Filed: Dec. 21, 1999

(51) Int. Cl.
*H04L 12/16* (2006.01)

(52) U.S. Cl. .................. 370/260; 370/270; 370/465; 379/202.01; 379/219; 455/433; 455/462; 455/519

(58) Field of Classification Search ............ 370/259, 370/260, 261, 262, 270, 465, 462, 468, 467; 379/88.19, 88.21, 88.23, 202.01, 207.01, 379/207.02, 219; 455/433, 435, 461, 462, 455/463, 464, 518, 519
See application file for complete search history.

(56) References Cited

U.S. PATENT DOCUMENTS

| | | | | |
|---|---|---|---|---|
| 5,666,159 | A | | 9/1997 | Parulski et al. ............ 348/211 |
| 5,737,491 | A | | 4/1998 | Allen et al. ............... 395/2.79 |
| 5,758,281 | A | * | 5/1998 | Emery et al. .............. 455/428 |
| 5,781,860 | A | * | 7/1998 | Lopponen et al. ........ 455/426.1 |
| 5,793,856 | A | * | 8/1998 | Nakamura ................ 379/201 |
| 5,890,064 | A | * | 3/1999 | Widergen et al. .......... 455/445 |
| 5,995,923 | A | * | 11/1999 | Mermelstein et al. ....... 704/219 |
| 6,032,051 | A | * | 2/2000 | Hall et al. ................ 455/518 |
| 6,073,023 | A | * | 6/2000 | Tirabassi et al. ........... 455/518 |
| 6,115,613 | A | * | 9/2000 | Jonsson ................... 455/519 |
| 6,161,016 | A | * | 12/2000 | Yarwood ................. 455/445 |
| 6,175,622 | B1 | * | 1/2001 | Chiniwala et al. .......... 379/211 |
| 6,188,767 | B1 | * | 2/2001 | Needham et al. ........... 380/271 |
| 6,215,790 | B1 | * | 4/2001 | Voit et al. ................ 370/401 |
| 6,249,584 | B1 | * | 6/2001 | Hamalainen et al. ........ 380/270 |
| 6,377,811 | B1 | * | 4/2002 | Sood et al. ................ 455/464 |
| 6,405,050 | B1 | * | 6/2002 | Amirijoo et al. ........... 455/518 |
| 6,430,599 | B1 | * | 8/2002 | Baker et al. ............... 709/203 |
| 6,445,920 | B1 | * | 9/2002 | Pfundstein ................ 455/426 |
| 6,453,035 | B1 | * | 9/2002 | Psarras et al. .......... 379/221.08 |
| 6,477,370 | B1 | * | 11/2002 | Sigler et al. .............. 455/427 |
| 6,493,550 | B1 | * | 12/2002 | Raith .................. 455/422.1 |
| 6,505,034 | B1 | * | 1/2003 | Wellig .................... 370/468 |
| 6,510,327 | B1 | * | 1/2003 | Jung et al. .............. 455/575.1 |
| 6,539,237 | B1 | * | 3/2003 | Sayers et al. .............. 455/555 |

(Continued)

OTHER PUBLICATIONS

Ericsson, Microelectronics Bluetooth Products: Bluetooth Wireless Connectivity, downloaded from web page http://www.ericsson.com/microe/bluetooth.html on Dec. 5, 1999.

*Primary Examiner*—Chi H. Pham
*Assistant Examiner*—Shick Hom

(57) ABSTRACT

Currently, networks are used within most enterprises to allow for sharing of resources such as printers and to allow for central server features to be available such as backup operations, shared files, and internal email. With the introduction of the third generation of wireless communication networks in which a mobile station can have an always on capability, private networks can now be established between mobile stations. In these implementations, the mobile stations each have a Home Location Registration (HLR) and a unique Internet Protocol (IP) address. The mobile stations within a private network are listed within a table stored in the intelligent peripheral by their HLRs. The intelligent peripheral regulates the flow of data units within the wireless network by determining if the sender of a packet and the intended recipient are within the same private network.

55 Claims, 9 Drawing Sheets

U.S. PATENT DOCUMENTS

| | | | |
|---|---|---|---|
| 6,549,768 B1 * | 4/2003 | Fraccaroli ................ | 455/456.3 |
| 6,594,238 B1 * | 7/2003 | Wallentin et al. ........... | 370/252 |
| 6,600,726 B1 * | 7/2003 | Nevo et al. ................. | 370/278 |
| 6,826,414 B1 * | 11/2004 | Reynolds et al. ............ | 455/555 |
| 6,931,016 B1 * | 8/2005 | Andersson et al. .......... | 370/401 |
| 2003/0037160 A1 * | 2/2003 | Wall et al. ................... | 709/233 |
| 2003/0038961 A1 * | 2/2003 | Lynch et al. ............... | 358/1.15 |

\* cited by examiner

FIRST PRIVATE NETWORK GROUP

| NODE REGISTRATION | DATA ADDRESS |
| --- | --- |
| HLR X | 10.1.1.1 |
| HLR Y | 10.1.1.2 |
| HLR Z | 10.1.1.3 |
| 10.1.2.0 | 10.1.2.1 |
| 10.1.2.0 | 10.1.2.2 |

FIG.9A

SECOND PRIVATE NETWORK GROUP

| NODE REGISTRATION | DATA ADDRESS |
| --- | --- |
| 10.1.1.0 | 10.1.1.1 |
| 10.1.1.0 | 10.1.1.2 |
| 10.1.1.0 | 10.1.1.3 |
| 10.1.2.1 | 10.1.2.1 |
| 10.1.2.2 | 10.1.2.2 |

FIG.9B

WIRELESS NETWORK COMMUNICATIONS

RELATED APPLICATIONS

U.S. patent application Ser. No. 09/468,119 etitled "APPARATUS AND METHOD FOR WIRELESS DATA COMMUNICATIONS" by Brisebois et al, filed on Dec. 21, 1999, and assigned to the assignee of the present application, discloses and claims subject matter related to that of the present invention and is herein incorporated by reference.

FIELD OF THE INVENTION

This invention relates generally to wireless communications and more specifically to apparatus and methods used to establish wireless network communications.

BACKGROUND OF THE INVENTION

There are currently a large number of devices within corporations and households that require physical wiring in order to communicate with each other. This is particularly evident in an office environment where a "fully connected" computer may have wiring connections to a monitor, a keyboard, a printer, and a central server. Some computers may further be physically coupled to scanners and/or facsimile machines. To accommodate the needs of a typical office worker, networks have been established in a majority of medium to large office environments to reduce the required number of printers and other possible shared devices such as scanners. These networks further allow for each networked computer to be connected to a central server in which files and news can be shared, overall backup and security operations for the entire network can be performed, internal email services can be established, and internal and external communications can be controlled. The functionality of these networks have been deemed essential to the efficient operation of an office workplace.

There are a number of key problems with these network configurations as they currently exist. For one, network designs can become extremely complex as more devices are added, resulting in complicated wiring arrangements in many cases. In these wiring arrangements, the network is configured by physically laying wire, which is time consuming and difficult to adjust when adding or removing devices. Further, in some wiring arrangements, computers may be coupled within the network to some devices, such as printers, only through other computers that must stay powered in order for the connection to remain. Another key problem with wired networks as currently designed is the physical limitation the actual wiring itself causes on the network. The use of wired connections essentially limits the network to devices that are within a single location, with few options for remote access. Hence, as currently designed, wired networks are not practical for the growing mobile workforce.

One attempt to overcome the problems experienced by current wired network configurations is to use wireless communications based upon the operation of a new standard called Bluetooth. A Bluetooth transceiver as currently conceived is a short range radio transceiver operating in the 2.45 GHz unlicensed band. The implementation of Bluetooth transceivers within a wide variety of devices such as mobile telephones, laptop computers, printers, and electronic cameras is envisioned for the future. For instance, Internet connections for a laptop could be established via a Bluetooth link to a mobile telephone and further a standard wireless link to a wireless telephone network coupled to a Publicly Switched Telephone Network (PSTN). Further ideas include having a Bluetooth link between an electronic camera and a printer, the printer producing copies of all photographs taken by the camera.

There are a number of problems with the Bluetooth vision for wireless devices. For one, the short-range links have a limited applicability and do not solve the problems discussed herein above concerning remote access to a wired network or the problems of mobile workers. Further, for Bluetooth to be successful, a large proportion of corporations that produce the computers, mobile telephones, printers, cameras, etc must agree to implement a common new standard. Currently, this is not the case with many major corporations refusing to recognize and implement the new standard. Yet further, the frequency range selected for Bluetooth communications is the same as several established local wireless technologies which could cause packets of data from different sources to interfere, resulting in degraded performance.

Access to wired networks from remote locations outside the network's wiring architecture is currently possible, though these techniques do not reduce the other problems discussed herein above for a wired network. One option for achieving this remote access is by allowing people to dial up and register with the network. One problem with this is the difficulties of dialling up and logging into a network which is typically a secure network for a corporation. Further, although it is possible to connect through dial up, this technique does not allow for the connection to be maintained at all times as these connections are strictly "on" or "off".

A technique currently used to allow for connections to be maintained at all times between remote locations and a central network is with use of reserved bandwidth on a PSTN. This technique, which creates a Virtual Private Network (VPN) for the user, is used by many banks and other businesses that have numerous locations of business that all must be connected to a central network. Unfortunately, this technique can be impractical for small businesses due to the cost and complexity of such a system. Further, it does not aid a mobile workforce, as this technique still requires physical connections that cannot easily move with the workers.

Hence, an improved networking system is required that does not have the limitations of a wired network. Preferably this improved network system could be accessible to the mobile workforce while at the same time capable of being implemented within an office environment.

SUMMARY OF THE INVENTION

The present invention is directed to apparatus, networks and methods that will allow for the establishment of private networks within a wireless environment. In preferred embodiments of wireless networks of the present invention, a plurality of mobile stations are grouped together within a private network group. This private network group is preferably stored within a private network group table comprised within an intelligent peripheral of a third generation (3G) wireless network. With use of the table, the intelligent peripheral can preferably determine which mobile stations are within the same private network group and thus limit the access depending upon the type of data unit sent to a mobile station within a private network group to only other mobile stations within the private network group. In other embodiments, a private network can consist of fixed wire and mobile telephone stations.

The present invention, according to a first broad aspect, is an apparatus for controlling data unit communications between a plurality of mobile stations, each of the mobile stations arranged to maintain communication links with the apparatus. In this aspect, the apparatus groups at least two of the plurality of mobile stations as members of a private network group and determines if a first-mobile station sending a data unit and a second mobile station scheduled to receive a data unit are both members of the private network group. Only if they are both members of the private network group, the apparatus further enables communication of the data unit from the first mobile station to the second mobile station. Alternatively, the apparatus disables communication of the data unit from the first mobile station to the second mobile station if they are not both members of the private network group.

Preferably, each of the mobile stations has a corresponding node registration and data address; the node registrations preferably being Home Location Registrations (HLRs) and the data addresses preferably being Internet Protocol addresses. The node registrations for each of the mobile stations within the private network group are listed within a private network group table stored within the apparatus, allowing a searching of the node registrations of the first and second mobile stations to be used to determine whether they are both members of the private network group. The data addresses for the mobile stations are preferably used as source and destination addresses within the data units. The listing of both the node registrations and the data addresses within the private network group table allows for the determining of the node configuration concerning the second mobile station by looking up the destination data address within the data unit.

In some embodiments of the present invention, the private network group includes mobile stations within a plurality of cell clusters that are controlled with different apparatus. In these embodiments, the apparatus still preferably maintains a table with all the mobile stations of the private network group included, but the HLRs of the mobile stations that do not maintain a communication link with the particular apparatus are listed as a data address for the apparatus they do maintain a communication link with. This data address, which is preferably an IP address, is used as a forwarding address for any data units that are directed to the particular mobile station.

The present invention, according to a second broad aspect, is an apparatus similar to the apparatus of the first broad aspect but for controlling data unit communications between a first set of at least one mobile telephone station and a second set of at least one fixed wire telephone station. The mobile station is arranged to maintain a communication link with the apparatus. Some of the telephone stations of the first and second sets are grouped within a private network group with the apparatus controlling the communication of data units in a similar manner to that described above for the first aspect. Preferably, the telephone stations of the first and second groups each have a corresponding node registration which are HLRs for the mobile telephone stations of the first set and a data address corresponding to a second apparatus for the fixed wire telephone stations of the second set.

The present invention, according to a third broad aspect, is a private network comprising a data network, a plurality of apparatus coupled to the data network, and a plurality of sets of at least one telephone station which are arranged to maintain communication links with a respective one of the apparatus. In this aspect, each of the apparatus groups at least two of the plurality of telephone stations as members of a private network group and determines if a first telephone station that maintains a communication link with the particular apparatus and is sending a data unit, and a second telephone station that maintains a communication link with a second one of the apparatus and is scheduled to receive a data unit are both members of the private network group. Only if the first and second telephone stations are both members of the private network group, the apparatus further enables communication of the data unit from the first telephone station, via the data network, to the second apparatus. In preferred embodiments, at least one of the apparatus is an intelligent peripheral coupled within a third generation wireless network and at least one is a server coupled to a Local Area Network (LAN).

The present invention, according to a fourth broad aspect, is a wireless network comprising an apparatus, a radio network controller coupled to the apparatus, at least one base transceiver station coupled to the radio network controller, and a plurality of mobile stations that are each arranged to maintain a communication link with one of the at least one base transceiver station. In this aspect, the apparatus groups at least two of the plurality of mobile stations as members of a private network group and determines if a first mobile station sending a data unit and a second mobile station scheduled to receive a data unit are both members of the private network group. Then, only if they are both members of the private network group, the apparatus further enables communication of the data unit from the first mobile station to the second mobile station.

In yet a further aspect, the present invention is a method of enabling communication of a data unit from a first mobile station to a second mobile station. This method incorporating the operations performed by the apparatus of the first broad aspect described above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which:

FIGS. 9A and 9B are sample tables illustrating first and second private network group tables that could be stored within the intelligent peripheral and the web-based server of FIG. 8 respectively.

DETAILED DESCRIPTION OF THE PREFERRED EMBODIMENT

The present invention, according to preferred embodiments, is directed to an added data feature implemented within a third generation (3G) wireless network such as a Universal Mobile Telecommunications System (UMTS) network which complies with the system defined by the International Telecommunications Union (ITU) as IMT-2000. A 3G wireless network has additional functionality to previous wireless technologies as is described below with reference to FIG. 1. Although this description is specific to a 3G wireless network, it should be recognized that other wireless technologies could be utilized that have similar functionality.

The added data feature within embodiments of the present invention is a private network feature in which a set of telephone stations, some or all of which are mobile stations, are implemented as nodes of a Virtual Private Network (VPN) for data communications. This set of nodes is hereinafter referred to as a private network group. Although the scope of the present invention encompasses embodiments that include a combination of mobile stations and fixed wire telephone stations, the preferred embodiments initially described herein below are directed to VPNs which have only mobile stations as members of the private network group. These VPNs which only have mobile stations as nodes are hereinafter referred to as Wireless VPNs (WVPNs).

Figure 1:
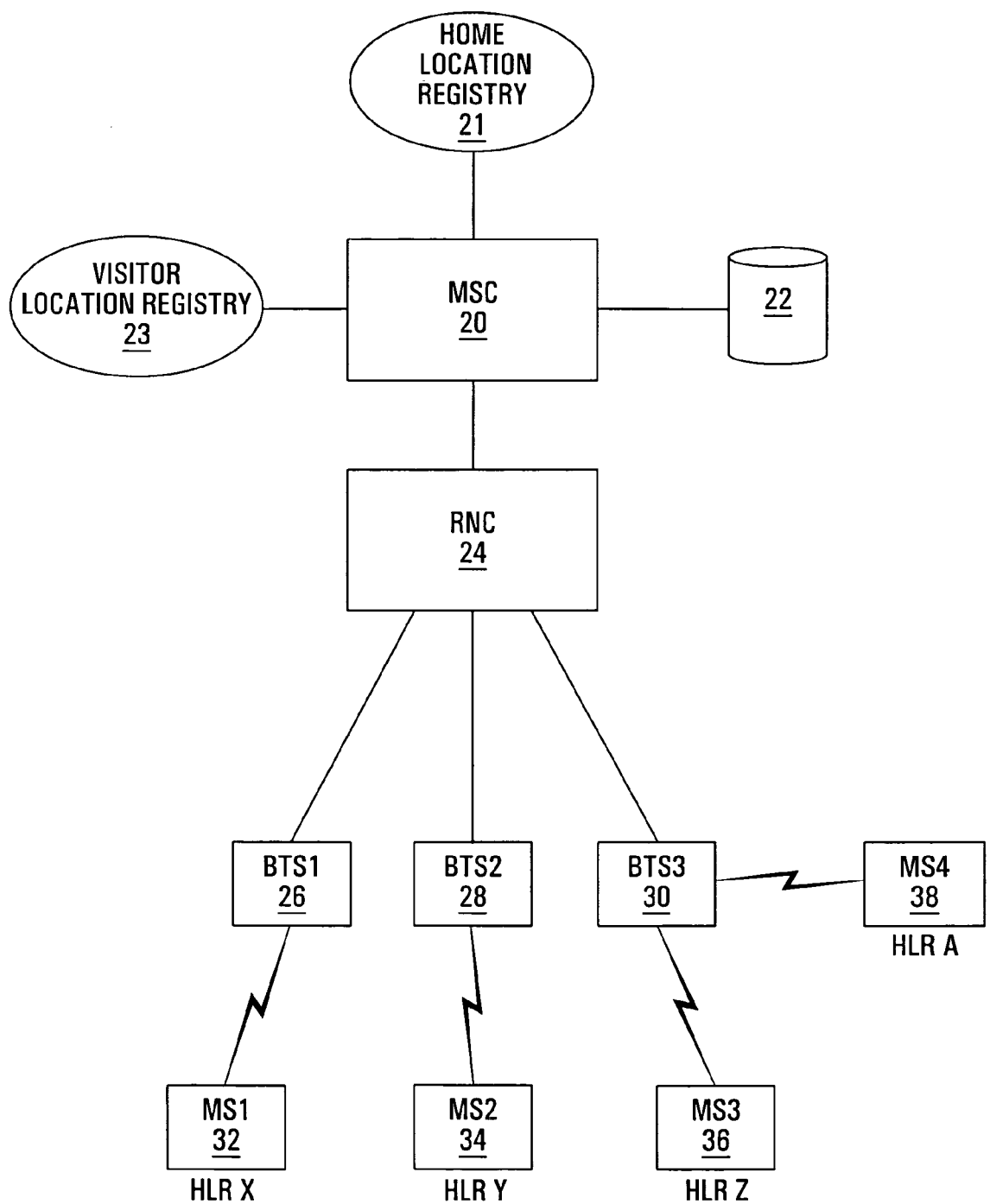
FIG. 1 is a block diagram illustrating a third generation wireless network.

FIG. 1 illustrates a 3G wireless network according to a preferred embodiment of the present invention. This wireless network includes a core network which in this case comprises Mobile Switching Center (MSC) 20; a server referred hereinafter as an intelligent peripheral 22, a home location registry 21, a visitor location registry 23 and a Radio Network Controller (RNC) 24 each independently coupled to the MSC 20; first, second and third Base Transceiver Stations (BTSs) 26,28,30, each coupled to the RNC 24; and first, second, third and fourth mobile stations 32,34,36,38 communicating, preferably with data communications, with the first BTS 26, the second BTS 28, the third BTS 30 and the third BTS 30 respectively. The MSC 20 is further coupled to other MSCs (not shown) and a Transit Switching Center (TSC) (not shown) which is further coupled to a PSTN (not shown), the other MSCs and PSTN communicating with a plurality of fixed wire and/or mobile stations (not shown). Although the wireless network of FIG. 1 illustrates one RNC, three BTSs, and four mobile stations, it should be understood that other numbers of these devices could be implemented within a wireless network while still being within the scope of the present invention.

Within the network of FIG. 1, the MSC 20 controls the connecting of mobile stations within a predefined cell cluster area assigned to the particular MSC 20 with other telephone stations, the other telephone stations being other mobile stations or fixed wire telephone stations coupled to the PSTN (not shown). A number of mobile stations are assigned to the MSC 20, each of these mobile stations having a corresponding Home Location Registration (HLR) with the MSC 20, these HLRs being stored within the home location registry 21. In the case shown in FIG. 1, the mobile stations 32,34,36,38 have been assigned respective HLR X, HLR Y, HLR Z, and HLR A. Mobile stations that are within the cell cluster area of the MSC 20, but that are not part of the home location registry 21, are included within the visitor location registry 23 and assigned a Visitor Location Registration (VLR). The MSC 20 communicates with the MSC(s) that the mobile station(s) within the visitor location registry are assigned in order to determine which services, if any, to provide the particular mobile station(s).

The intelligent peripheral 22 is designed to control service features that are available to the mobile stations within the cell cluster area of the MSC 20. Examples of possible service features controlled by the intelligent peripheral include call waiting, call forwarding and call blocking, each of which are well-known in the wired telephone environment. Further, the intelligent peripheral 22 maintains a registry of all the mobile stations assigned to the MSC 20 by maintaining a database of all their HLRs.

3G wireless networks are designed to allow for the communications between the mobile stations and the BTSs to be of variable bandwidth. Within the network of FIG. 1 the control of this variable bandwidth between mobile stations 32,34,36,38 and their respective BTSs 26,28,30,30 is preferably performed within the RNC 24. In this case, other components that require an increase in the communication bandwidths to be established must request such bandwidth levels from the RNC 24. The RNC 24 controls the bandwidth levels of the BTSs 26,28,30 to ensure that the overall bandwidth level for each of the BTSs is below a maximum threshold level that the particular BTS can accommodate. In some circumstances, the RNC 24 can initiate hand-offs for one or more mobile stations from a first BTS to a second BTS in order to lower the bandwidth requirements on the first BTS. Preferably, the RNC 24 exclusively controls the reducing of bandwidths between devices as required. In one particular embodiment, the bandwidth between a mobile station and its BTS is reduced to a minimum level if no signals are sent for a predetermined time period.

One important possible operation of the 3G network results from this variable bandwidth capability. Since the bandwidth is adjustable from a very low level to a high level limited only by the bandwidths of the BTS and mobile station utilized, a very low bandwidth connection can be permanently maintained between a mobile station and its corresponding BTS. This essentially allows a mobile station within a 3G wireless network to possibly have an "always on" option; this "always on" option allowing for many different capabilities that previous wireless networks did not have. For the embodiments of the present invention described herein below in detail, this "always on" option is an important feature that is used.

As mentioned previously, embodiments of the present invention are directed to the implementation of VPNs for data communications with one or more of the nodes of the VPN being mobile stations. In these embodiments, the mobile stations must maintain connection with the other nodes of the VPN in order to remain a part of the network. Hence, the "always on" capability of the mobile stations within a 3G wireless network allows them to be implemented within the VPNs according to embodiments of the present invention.

Figure 2:
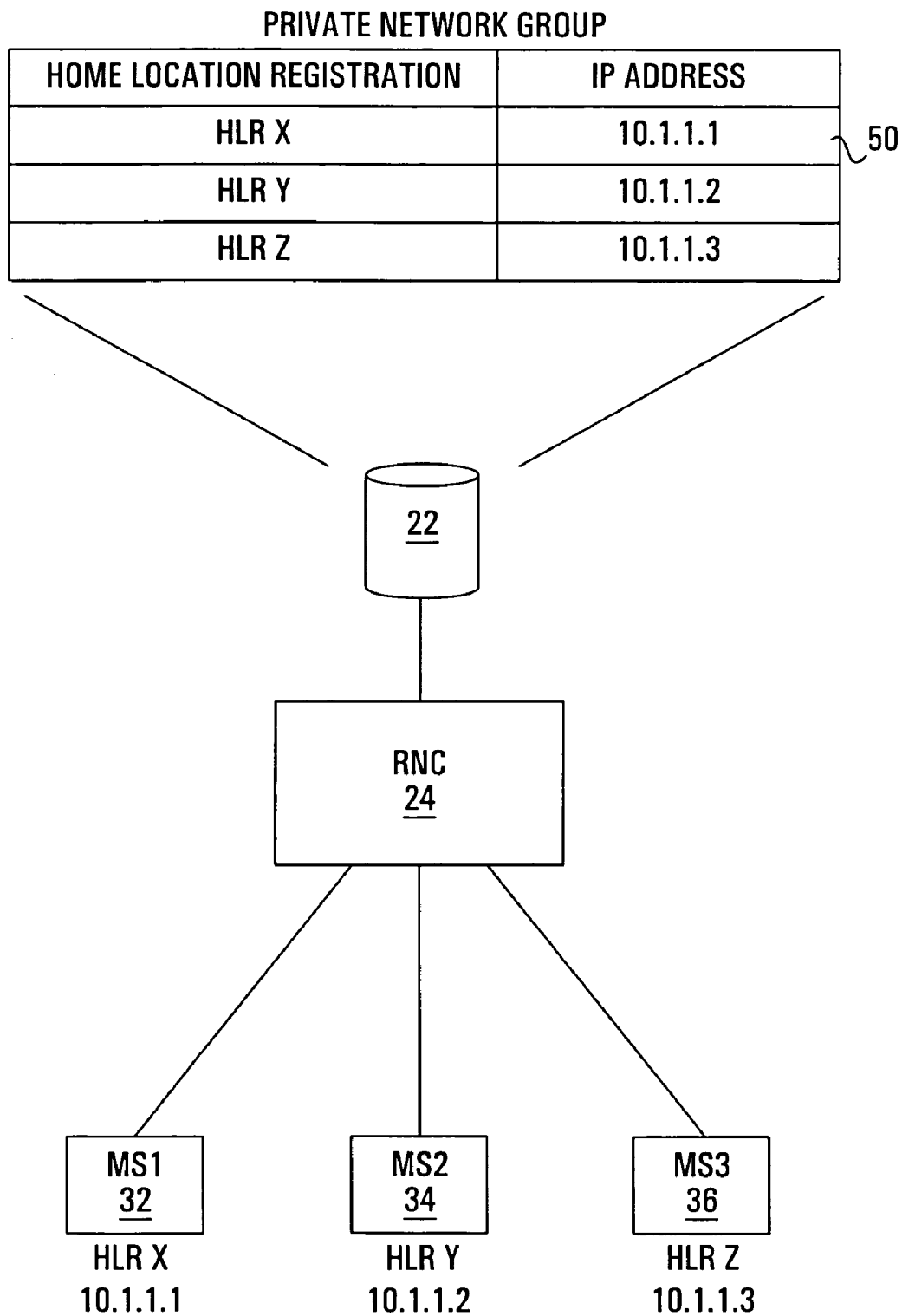
FIG. 2 is a logical block diagram illustrating a Wireless Virtual Private Network (WVPN) according to embodiments of the present invention.

The operation of a WVPN according to preferred embodiments of the present invention will now be described with reference to the logical block diagram of FIG. 2. In this figure, the WVPN comprises the intelligent peripheral 22, the RNC 24 coupled to the intelligent peripheral 22, and the first, second and third mobile stations 32,34,36 coupled independently to the RNC 24. The coupling between the RNC 24 and each of the mobile stations 32,34,36 is "always on" with a minimal bandwidth being maintained while the mobile station is in operation. The fourth mobile station 38 is not illustrated on FIG. 2 as this mobile station is not included as a node within the WVPN in this example and therefore, as described below, will not have access to the mobile stations 32,34,36 of the WVPN. The other components of a wireless network as shown in FIG. 1 are not shown in the logical block diagram of FIG. 2 as these components preferably do not require modifications from their well-known operations in a 3G wireless network. In the situation of FIG. 2, there are three mobile stations 32,34,36 included as members of the private network group. In other embodiments of WVPNs, there could be more or less than three mobile stations, and thus this should not limit the scope of the present invention.

As can be seen in FIG. 2, the intelligent peripheral 22 includes a private network group table 50 for the private network group of interest. In other embodiments, in which a plurality of private network groups are established, it should be understood that each private network group would have a corresponding private network group table stored within the intelligent peripheral 22. The private network group table 50 of FIG. 2 comprises a list of all the HLRs corresponding to the members of the private network group of interest as well as a respective data address for each HLR, this list of HLRs being a subset of the overall list of HLRs within the home location registry 21. In the embodiment illustrated in FIG. 2, the HLRs corresponding to the first, second and third mobile stations are stored in the list along with their respective Internet Protocol (IP) addresses. Hence, HLR X that corresponds to the first mobile station 32 is stored along with IP address 10.1.1.1; HLR Y that corresponds to the second mobile station 34 is stored along with IP address 10.1.1.2; and HLR Z that corresponds to the third mobile station 36 is stored along with IP address 10.1.1.3. Although the embodiments described herein below use IP addresses as the data addresses for the HLRs, it should be recognized that other data addressing schemes could be utilized. For example, the data addresses could be words such as the names of the people corresponding to the HLRs.

The generating of the private network group table 50 can take place in a number of ways. In one embodiment, the users of the WVPN inform the service provider of the 3G wireless network the data addresses that correspond to each mobile station that is a member of the private network group. In this case, the service provider then manually enters the information and stores it within the intelligent peripheral 22. In another embodiment, the users themselves have the option of initiating and/or modifying a private network group table through a connection with the intelligent peripheral 22. This connection preferably comprises an Internet interface in which a user can log in with a login identification and password or another security administration technique.

There are numerous possible operations for a WVPN using the intelligent peripheral 22 containing the private network group table 50 according to preferred embodiments of the present invention. In one possible operation, each of the mobile stations 32,34,36 are portable computers with a 3G wireless modem installed, the portable computers together essentially forming a wireless Intranet. To form the Intranet, each of the portable computers is preferably running a web-based interface program such as Netscape Communicator 4.0 produced by Netscape Communications Corporation of Mountain View, Calif. and at least one of the computers is preferably running a web-based server program such as Internet Information Server (IIS) produced by Microsoft Corporation of Redmond, Wash. This web-based server program allows the particular computer to operate as a host for one or more web pages and/or operate as an email central server. In some embodiments, a computing device is included within the Intranet, the exclusive purpose of which is to operate as a web-based server.

The operation of accessing a web page within the WVPN of FIG. 2 is now described with reference to the signalling diagram of FIG. 3. In the illustrated situation, a user of the first mobile station 32, a first computer within the Intranet, wants to access data information from the second mobile station 34, a second computer within the Intranet that has a web-based server capability. In this situation, the user of the first computer preferably enters the IP address corresponding to the second computer through the web-based interface program running on the first computer. In the preferred embodiment, the web-based interface program then sends a contact/data request signal 60 to the intelligent peripheral 22 via the BTS 26, the RNC 24 and the MSC 20. The contact/data request signal 60 comprises source and destination addresses which are the IP addresses of the first and second computers (10.1.1.1, 10.1.1.2) respectively in this case. Further, the contact/data request signal 60 preferably comprises a contact acknowledgement request and/or a data request. The data request possibly indicates the specific data information required or simply indicates the HTML file of a specific web page that is needed. If the contact/data request signal 60 is especially large, it may be necessary for the first mobile station 32 to initially request for an increase in bandwidth from the RNC 24 prior to the sending of the contact/data request signal 60.

Once the intelligent peripheral 22 receives the contact/data request signal 60, the peripheral 22 determines whether the HLR corresponding to the mobile station that sent the signal 60 is allowed access to the requested IP address listed as the destination address. In the case depicted in FIG. 3, this is done with the intelligent peripheral 22 determining whether the HLR X, that being the HLR for the first mobile station 32, is in the same private network group table as the HLR corresponding to the destination IP address (10.1.1.2), that being HLR Y of the second mobile station 34.

If the HLRs are not found to be in the same private network group table, the intelligent peripheral 22 preferably sends a contact denied signal to the first mobile station 32. This contact denied signal preferably informs the user of the first computer that the IP address requested is not available.

Figure 3:
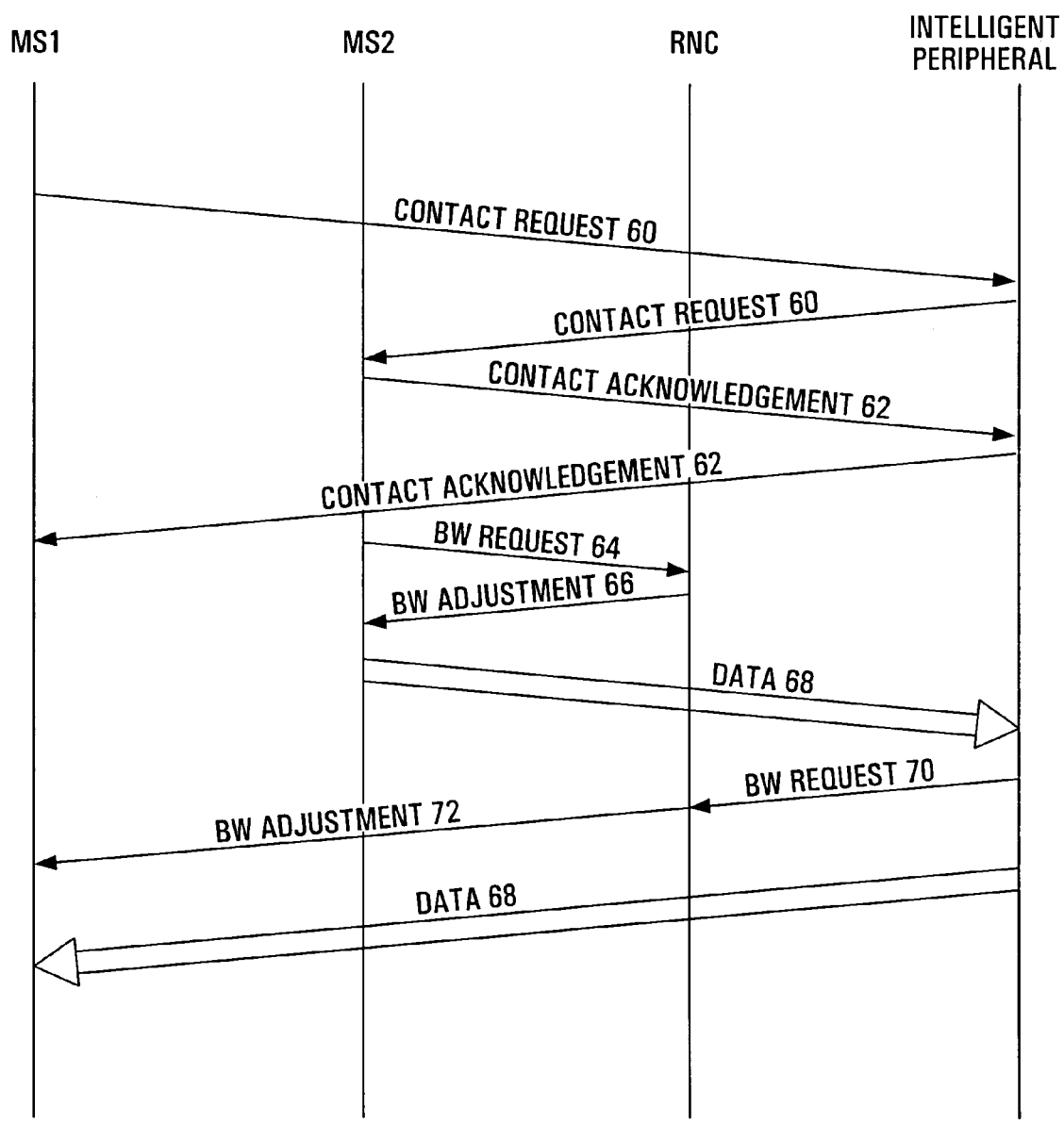
FIG. 3 is a signalling diagram illustrating the control and data signalling within the WVPN of FIG. 2 during a sample operation of a mobile station accessing a web page.

If the HLR of the requesting mobile station and the HLR of the destination address are within the same private network group table, the intelligent peripheral 22 forwards the contact/data request signal 60 to the HLR corresponding to the destination address, that being the second mobile station 34 in the case of FIG. 3. This forwarding takes place via the MSC 20, the RNC 24, and the second BTS 28. Similar to that described herein above, if the contact/data request signal 60 is especially large, it may be necessary for the intelligent peripheral 22 to initially request for an increase in bandwidth from the RNC 24 for the link between the second mobile station 34 and the second BTS 28 prior to the forwarding of the contact/data request signal 60.

After the second mobile station 34 receives the contact/data request signal 60, it performs actions similar to that done by a well-known computer with a web-based server capability. These actions include identifying the requests from the first computer and if possible responding as requested. In the case depicted in FIG. 3, the contact/data request signal 60 included a request for acknowledgement of contact and a data request for the download of a particular HTML file that corresponds to a web page and the associated files such as pictures to be displayed on the web page. Hence, the second mobile station 34 sends a contact acknowledgement signal 62 to the intelligent peripheral 22 for forwarding onto the mobile station corresponding to the source address (10.1.1.1) attached to the contact/data request signal 60, that being the first mobile station 32, and further, initiates the process of sending significant data information as will be described herein below. Similar to that described above for the contact/ data request signal 60, the contact acknowledgement signal 62 comprises source and destination addresses, those being the IP addresses of the second and first mobile stations 34,32 (10.1.1.2, 10.1.1.1) respectively in this case. As well, the intelligent peripheral 22 processes the contact acknowledgement signal 62 in similar fashion as described herein above for the signal 60 such that the signal 62 is forwarded to the HLR corresponding to the destination address within the signal 62 (the HLR X of the first mobile station 32); after the peripheral 22 determines that the source mobile station 34 has an HLR within the same private network group table as the destination mobile station 32.

The process of sending significant data information from the second mobile station 34 preferably begins with the second mobile station 34 sending a bandwidth request signal 64 to the RNC 24 via the second BTS 28. If the bandwidth request is accepted by the RNC 24, the RNC 24 sends bandwidth adjustment signals 66 to the second mobile station 34 and the second BTS 28, which increases the communication bandwidth to a level satisfactory for the transmission of the data signals 68. After the bandwidth is increased, the second mobile station 34 sends data signals 68 to the intelligent peripheral 22 via the second BTS 28, the RNC 24 and the MSC 20. For the example described above, these data signals 68 comprise an HTML file and associated files such as pictures to be displayed on the web page defined by the HTML file. Each of the data signals 68 preferably comprises source and destination addresses that in this case correspond to the IP addresses of the second and first mobile stations (10.1.1.2, 10.1.1.1) respectively.

Once received at the intelligent peripheral 22, each of the data signals 68 is processed in the same manner as the contact/data request signal 60 and the contact acknowledgement signal 62. First, the intelligent peripheral 22 determines whether the HLR from which the signal is received is in the same private network group table as the HLR corresponding to the destination address. Next, after confirming that the HLRs are within the same table, the peripheral 22 forwards these data signals 68 to the HLR of the destination address, that being the first mobile station 32 in FIG. 3, via the MSC 20, the RNC 24 and the first BTS 26. Prior to the forwarding of the data signals 68, a BW request signal 70 is preferably sent from the intelligent peripheral 22 to the RNC 24 to increase the communication bandwidth between the first mobile station 32 and the first BTS 26. If the bandwidth request is accepted by the RNC 24, the RNC 24 sends bandwidth adjustment signals 72 to the first mobile station 32 and the first BTS 26, which increases the communication bandwidth to a level satisfactory for the transmission of the data signals 68. In alternative embodiments, no bandwidth request signal 70 is required to be sent from the intelligent peripheral 22 since the RNC 24 automatically increases the bandwidth, if possible, between the first mobile station 32 and the first BTS 26 when the data signals 68 arrive at the RNC 24 for forwarding to the first mobile station 32.

There are situations possible in which the bandwidth available for communications between a mobile station and its BTS is less than the requested bandwidth. Preferably, in this case, the mobile station requiring the increase in bandwidth is forwarded an insufficient bandwidth signal that indicates the situation to the user; resulting in further operations directed by the user being delayed until sufficient bandwidth can be allocated. Alternatively, the forwarding of the signals to or the transmitting of the signals from the particular mobile station simply continues with the limited bandwidth resulting in high transmission delays. In another alternative, the service provider offers "premium" bandwidth that would give an override priority to particular mobile stations that subscribe to increase the probability of sufficient bandwidth at all times.

It should be understood that mobile stations that are not listed within the private network group table 50 of FIG. 2, such as the fourth mobile station 38, would preferably have limited or no access to the mobile stations within the private network group. In some embodiments, user defined access to the mobile stations within the private network group from mobile stations outside the group is permitted. In these embodiments, the user defined access, which could include a list of control or data signals that are permitted, is preferably stored and processed within the intelligent peripheral 22. In the case that an attempt by a mobile station outside the private network group is made which is not permitted, the intelligent peripheral 22 sends access denied signals to the particular mobile station.

Figure 4:
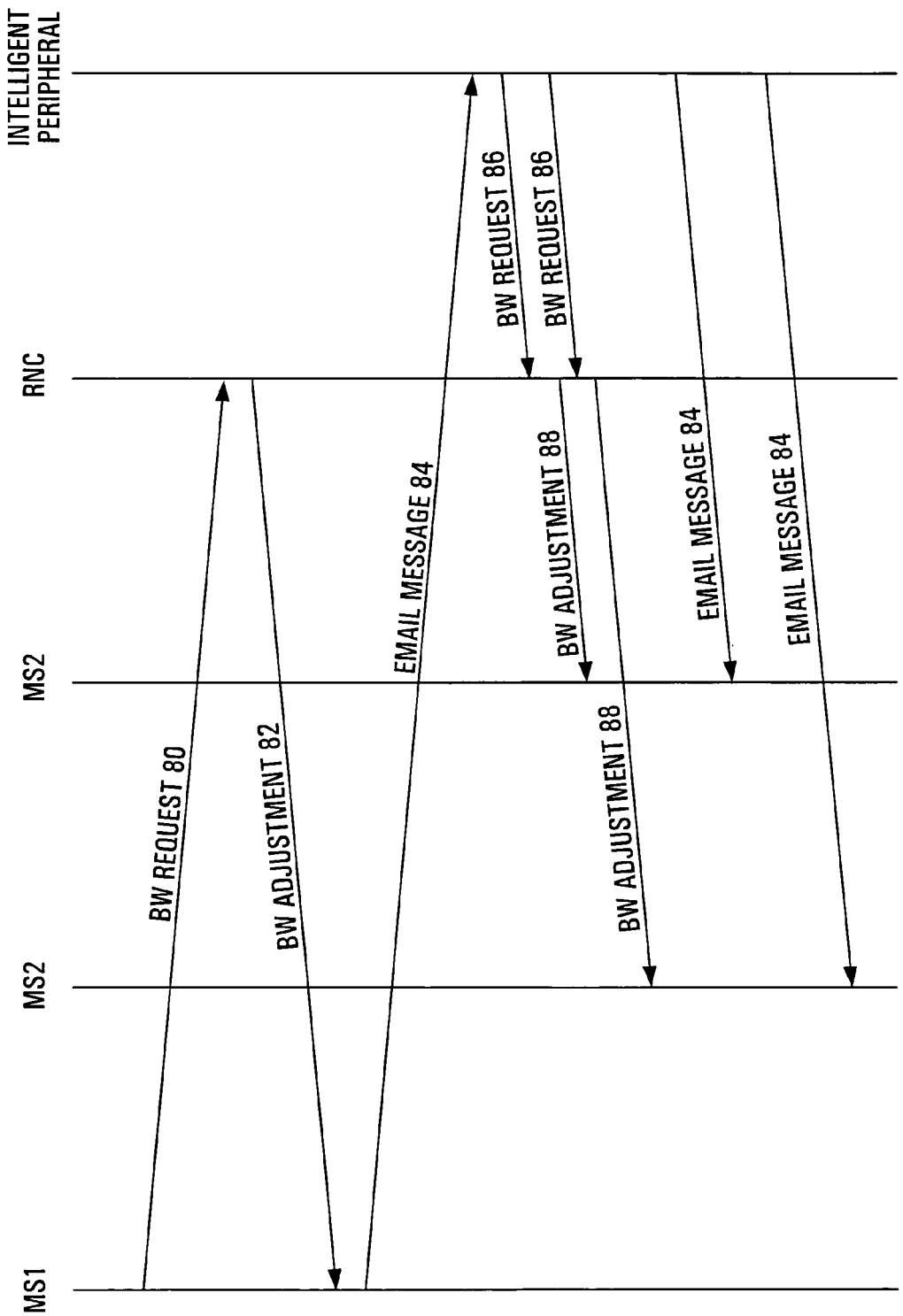
FIG. 4 is a signalling diagram illustrating the control and data signalling within the WVPN of FIG. 2 during a sample operation of a mobile station sending an email.

Another operation that can be supported within the WVPN of FIG. 2 is the operating of an email service within the Intranet comprising the first, second and third mobile stations 32,34,36. This email service could utilize the intelligent peripheral 22 as the central email server or possibly another component such as one of the mobile stations. In operation, as illustrated by example of FIG. 4, this email server allows a user of one of the mobile stations (MS1 in FIG. 4) to send an email message to one or more of the other mobile stations (MS2 and MS3 in FIG. 4) within the Intranet. Initially, in this situation, the mobile station sending the email message sends a bandwidth request 80 to the RNC 24, at which point the RNC 24 preferably accepts the bandwidth request and sends a bandwidth adjustment signal 82 to the particular mobile station and its BTS for increasing the communication bandwidth between the devices. Next, the particular mobile station sends the desired email message 84 to the intelligent peripheral 22 via its BTS, the RNC 24 and the MSC 20.

If the email server is supported within the intelligent peripheral 22, the processing and subsequent forwarding of the email message 84 to its proper recipients is controlled by the intelligent peripheral 22. The processing of the email message 84 in one embodiment entails determining the email addresses within a destination attribute of the email message; looking-up those email addresses to determine the corresponding data addresses, those data addresses preferably being IP addresses corresponding to the recipients' mobile stations; and looking up the data addresses of the desired recipients within private network group tables to determine if the HLR of the mobile station sending the email message (HLR X in the example of FIG. 4) is within the same private network group table as the HLR corresponding to each of the recipients (HLR Y and Z in the example of FIG. 4). If there are any problems at this stage, such as HLRs not being within the same private network group table, an error message preferably is sent back to the mobile station sending the email message. If there are no problems, the intelligent peripheral 22 preferably sends bandwidth request signals 86 corresponding to each of the recipients' mobile stations to the RNC 24 which preferably triggers the RNC 24 to increase the bandwidth between the recipients' mobile stations and their respective BTSs by sending bandwidth adjustment signals 88 to the recipients' mobile stations and corresponding BTSs. Next, the intelligent peripheral 22 forwards the email message 84 onto the mobile stations of the intended recipients.

In some alternative embodiments, the process is the same as described above for the processing and forwarding of email messages 84 from the intelligent peripheral 22 to the mobile stations of the recipients, but with a slight modification. In these alternative embodiments, the data addresses corresponding to each HLR are used as the email addresses as well, so that the initial look-up of the email addresses to determine corresponding data addresses is not necessary.

The mobile stations within the above sample operations of the WVPN of FIG. 2 are computers installed with 3G wireless network modems. The computers, in this setup, operate in similar fashion to well-known computers that send data packets to and receive data packets from a telephone line based modem. Similar to that for traditional modems, computers installed with a 3G wireless network modem must attach headers and footers to the packets, hereinafter referred to as the packet overhead, prior to the sending of the packets to the modem and must remove the packet overhead from the packets after receipt of data packets from the modem. This header comprises the source and destination addresses needed for proper processing and forwarding of the packets as described herein above for the sample operations of FIGS. 3 and 4. In the case of the IP standard as described above, the source and destination addresses are both respective IP addresses.

Although the above described sample operations of a WVPN are described with use of computers installed with 3G wireless network modems, this should not limit the scope of the present invention. Other apparatus, such as computer controlled components like printers, scanners and possibly facsimile machines, could also be linked within a WVPN according to embodiments of the present invention. The problem with linking the computer controlled component 107 within a WVPN is that these components generally cannot add/remove source and destination addresses from data information being sent/received; these addresses being required for the proper routing of data information through a WVPN such as shown in FIG. 2. Hence, standard 3G wireless network modems cannot be used to link these apparatus to a WVPN and therefore to other mobile stations within an Intranet.

In normal use, many computer controlled components, such as printers and scanners, communicate with computers through the use of a Universal Serial Bus (USB) cable or another wired interfacing standard. In the sample case of a USB cable being utilized, each of the computer controlled components and the computer have a corresponding USB port which has one of the two ends of the USB cable connected. In operation, a USB port converts data information that is received from the corresponding apparatus or computer into a standard USB format capable of transmission over the USB cable and converts data information received from the USB cable into a normal format capable of being processed within the corresponding apparatus or computer. Similar operations are performed by other interfacing standards. One positive aspect of the USB standard is the wide usage of the standard by a large number of manufacturing corporations producing computers, printers, scanners and home entertainment systems and components. One negative aspect of this standard is that, as currently designed, it requires a fixed wire connection between the computer controlled apparatus and the computer.

Figure 5:
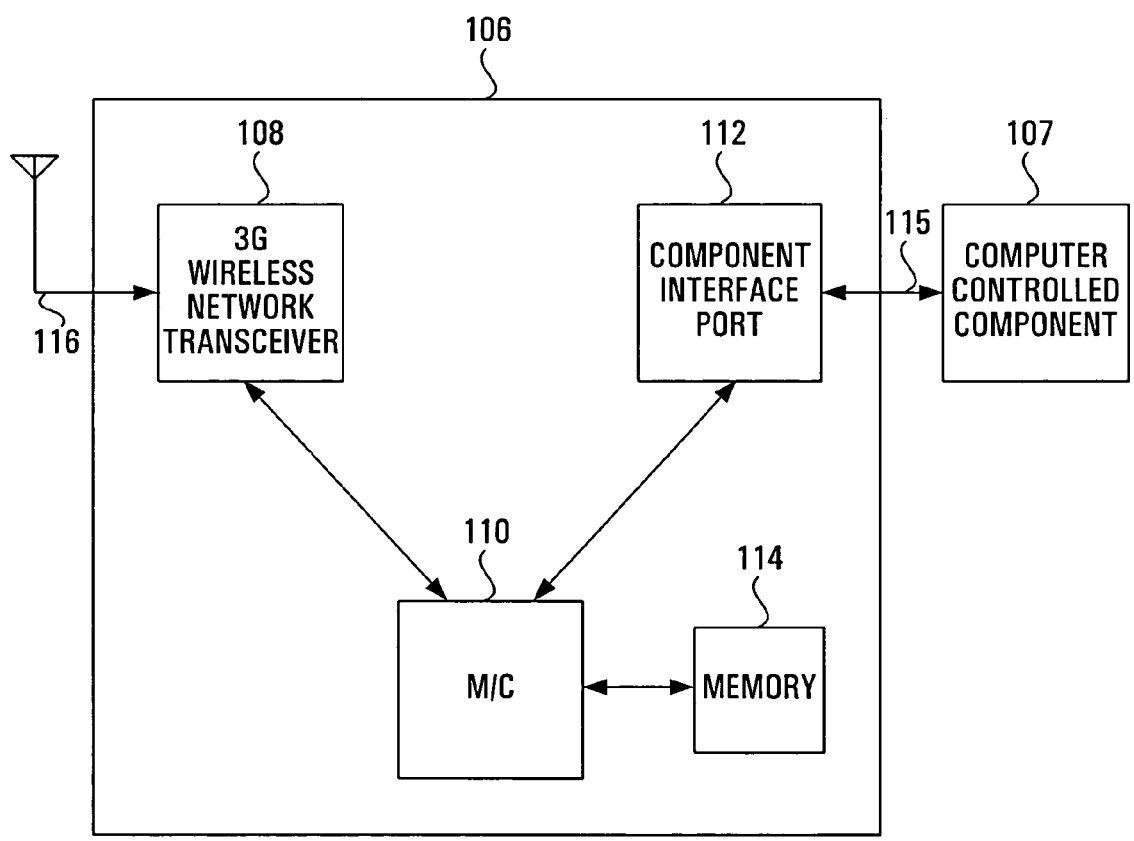
FIG. 5 is a block diagram illustrating a third generation wireless network interface apparatus according to preferred embodiments of the present invention.

FIG. 5 illustrates a block diagram of an interface apparatus 106, according to embodiments of the present invention, that is coupled via an interface cable 115 to a computer controlled component 107 that cannot typically add/remove source and destination addresses. In this setup, the interface apparatus 106 can operate as a mobile station that links the computer controlled component 107 to nodes within a 3G wireless network, the computer controlled component 107 and one or more of these nodes possibly forming a VPN within the 3G wireless network. As shown, this interface apparatus 106 comprises a 3G wireless network transceiver 108 coupled in series with a micro-controller (M/C) 110 and a component interface port 112, the component interface port preferably being a USB port. Further coupled to the micro-controller 110 is a memory device 114 though in some embodiments the memory device 114 is comprised within the micro-controller 110. In operation, the component interface port 112 is connected to the particular computer controlled component 107 via the interface cable 115, which is preferably a USB cable, while the 3G wireless network transceiver 108 communicates with a 3G wireless network via an antenna 116 coupled to the transceiver 108.

The micro-controller 110 in this interface apparatus 106 compensates for the inability of the computer controlled component 107 to add and remove packet overheads. The interface apparatus 106 itself has an associated HLR defined for the 3G wireless network transceiver 108 used and further has an associated data address; that data address preferably being an IP address stored within the memory device 114 that can be accessed by the micro-controller 110 as it processes received data information.

The operation of the interface apparatus 106 will now be described in the case that the component interface port 112 is a USB port and the computer controlled component 107 is a printer. When signals, such as print request signals, arrive at the transceiver 108 from the 3G wireless network, the transceiver 108 converts them into standard data packets which are forwarded to the micro-controller 110. The micro-controller 110 then saves the source address of these data packets within the memory device 114, removes the packet overhead from the data packets, and forwards the data information contained within the data packets to the USB port 112. The USB port 112 further converts the data information into the standard USB format and forwards the data information to the printer.

When data information, such as a print confirmation signal, is sent from the printer to the interface apparatus 106, the USB port 112 receives the data information within USB standard format, removes the USB formatting, and forwards the data information to the micro-controller 110. The micro-controller 110 converts the data information into data packets with associated headers and footers. In the header, a destination address is attached that is consistent with the previously stored source address of the received signal and a source address is attached that is consistent with the data address of the interface apparatus. In other cases, in which no destination address is stored within the memory 114, a user of the computer controlled component 107 could be prompted to select a destination address. This prompting would be initiated by the interface apparatus 106, a network management tool running within the wireless network, or an algorithm running on the computer controlled component 107. The data packets are then forwarded to the 3G wireless network transceiver 108 before the transceiver 108 converts it to a form capable of being transmitted to the 3G wireless network and further transmits the signals via the antenna 116.

Although the interface apparatus 106 is described herein above for use with computer controlled components, this should not limit the scope of the present invention. In general, the interface apparatus 106 could be used with any component capable of digital data processing. The interface apparatus 106 could even be used with digital data processing components that are capable of adding/removing packet overheads, such as personal computers. For instance, a personal computer may have both a 3G wireless network modem and an interface apparatus as depicted in FIG. 5. The data addresses and HLRs of the two devices would be different while still operating from the same computer.

Figure 6:
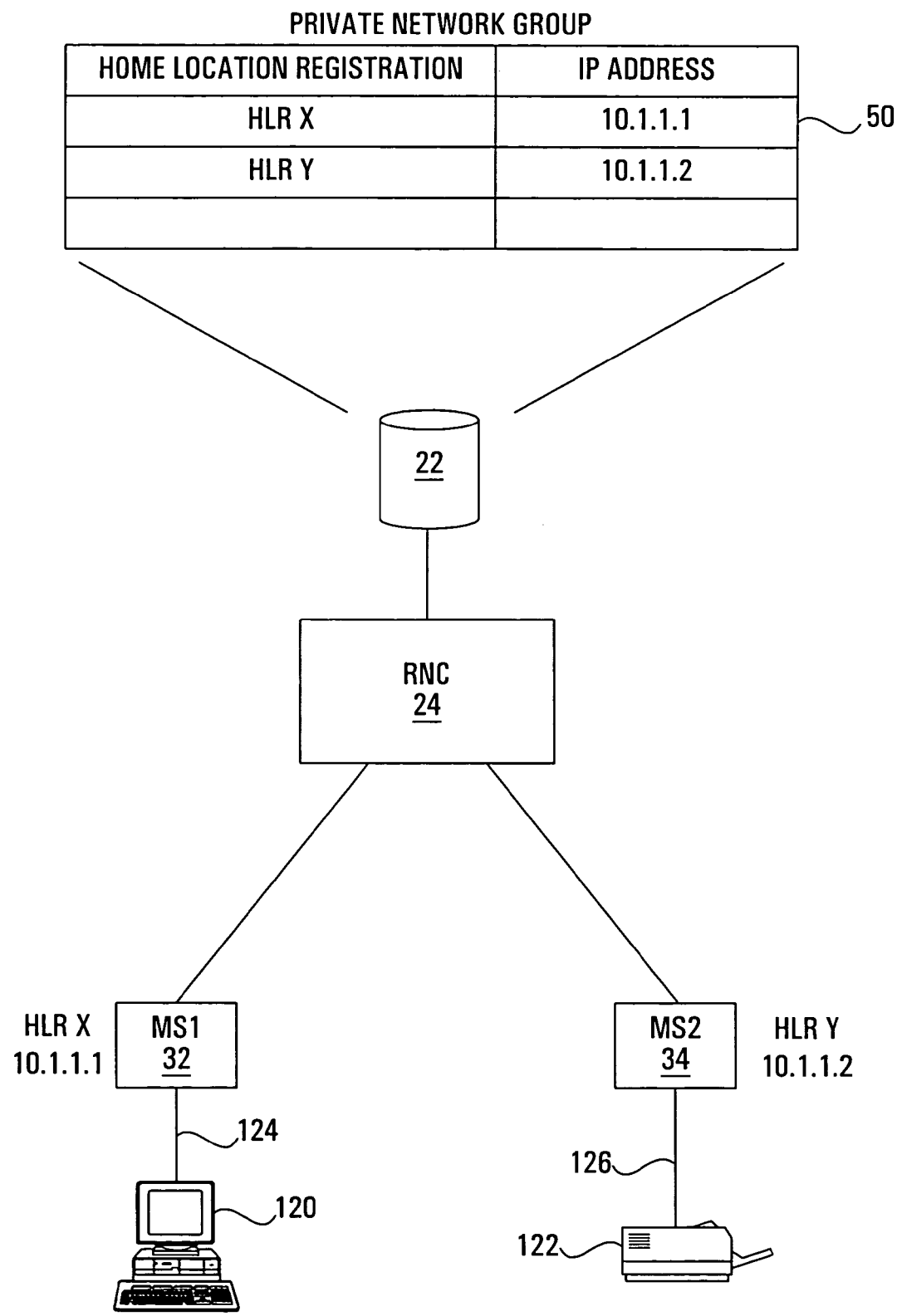
FIG. 6 is a logical block diagram illustrating a WVPN according to embodiments of the present invention utilizing the interface apparatus of FIG. 5.

An operation of a WVPN, according to a preferred embodiment of the present invention, is now described with reference to FIGS. 6 and 7 for the printing of a document via a 3G wireless network. FIG. 6 illustrates a logical block diagram of a WVPN capable of having a computer print a document via the actual WVPN. This diagram is virtually identical to that of FIG. 2, but with the first and second mobile stations 32,34 being coupled to a computer 120 and a printer 122 respectively. In this case, the first and second mobile stations 32,34 are each interface apparatus similar to that depicted in FIG. 5 that are coupled to the computer 120 and the printer 122 respectively via corresponding USB cables 124,126.

Figure 7:
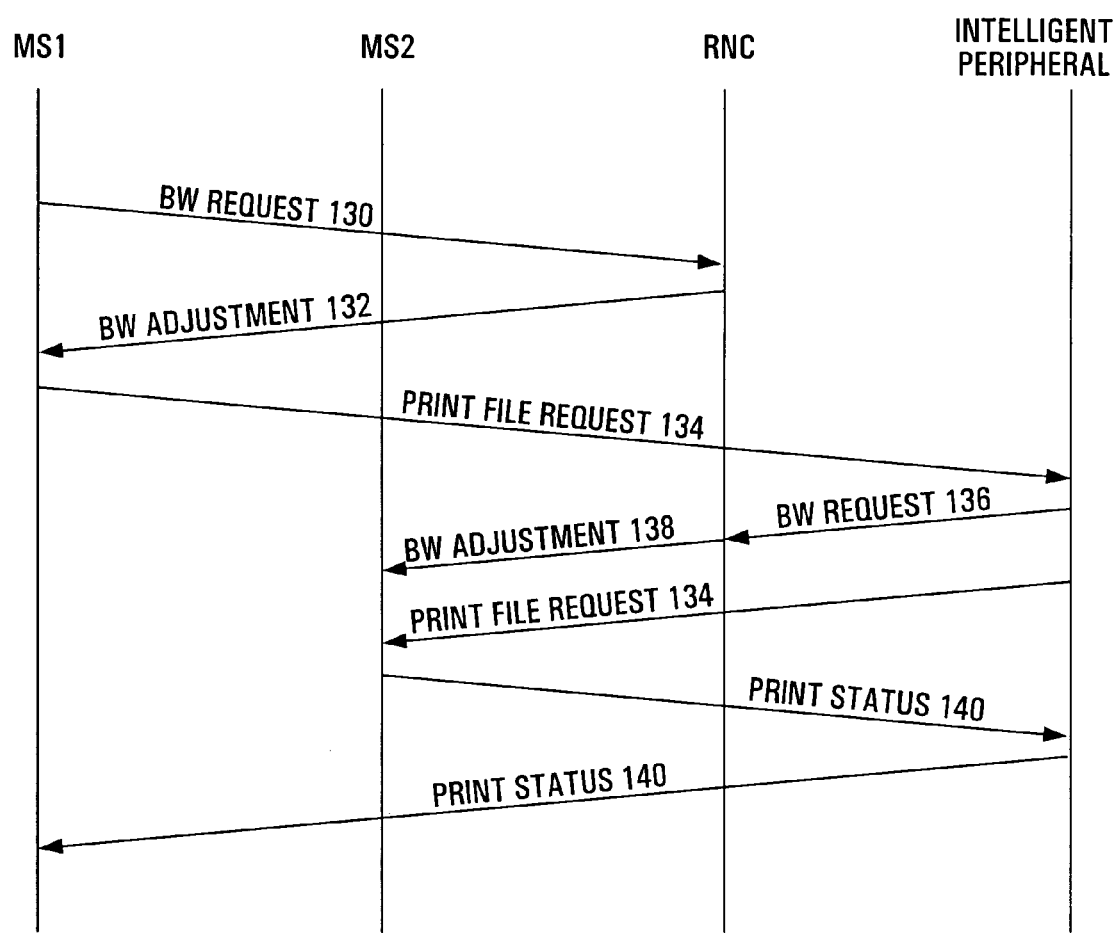
FIG. 7 is a signalling diagram illustrating the control and data signalling within the WVPN of FIG. 6 during a sample operation of a mobile station initiating a printing operation.

FIG. 7 is a signalling diagram illustrating a sample operation for the computer 120 to request a printing job with the printer 122 and the printer 122 subsequently sending a print status signal back to the computer 120. Initially, the first mobile station 32, that being an interface apparatus, receives a print file request which includes the data information to be printed from the computer 120. In one embodiment, the print file request has an indication to which printer the request is to be sent, the indication either specifically identifying the data address of the printer or the indication being used in a look-up table within the first mobile station 32 to determine the data address. In another embodiment, the first mobile station 32 reviews the print file request and determines that it is a request for printing; resulting in the first mobile station 32 sending the print file request to the data address saved within its memory for printing requests. In yet another embodiment, the first mobile station 32 is set to forward all files input through the USB port to a specific destination address. This could be used in the case that a user has two interface apparatus that are set within the same private network group table, the user coupling one to a USB port on his/her computer and coupling the other to the USB port on a printer.

Once the first mobile station 32 receives the print file request from the computer 120, the first mobile station 32 adds a packet overhead to the request including a destination address as discussed above and a source address corresponding to the predefined source address for the first mobile station 32. Next, as can be seen in FIG. 7, the first mobile station 32 preferably sends a bandwidth request 130 to the RNC 24 to increase the bandwidth between the first mobile station 32 and the first BTS 26. If accepted, the RNC 24 increases the bandwidth between the two devices by sending a bandwidth adjustment signal 132 to both the first mobile station 32 and the first BTS 26. Subsequently, the first mobile station 32 forwards a print file request 134 in a packet-based format to the intelligent peripheral 22.

The intelligent peripheral 22 then operates as described previously including determining if the HLR of the sending party is within the same private network group table as the HLR corresponding to the destination address. If the HLRs are within the same table, the intelligent peripheral 22 next sends a bandwidth request 136 to the RNC 24 to increase the bandwidth between the second mobile station 34 and the second BTS 28. If accepted, the RNC 24 sends a bandwidth adjustment signal 138 to the two devices to increase their communication bandwidth. Next, the intelligent peripheral 22 forwards the print file request signal 134 to the second mobile station 34.

The second mobile station 34, that in this case comprises an interface apparatus, proceeds to remove the packet overhead from the print file request 134 and forward the printing request to the printer 122. The printer 122 prints the requested file as usual or determines there is an error in the printing operation such as the printer 122 being out of paper. In either case, a print status signal is preferably sent back to the second mobile station 34, either comprising a print successful message or an error indication. The second mobile station 34 receives this print status signal; adds a packet overhead comprising a destination address corresponding to the previously received source address and a source address corresponding to the predefined source address of the mobile station 34; and forwards a packetized print status signal 140, via the second BTS 28, the RNC 24, the MSC 20, the processing of the intelligent peripheral 22, the MSC 20, the RNC 24 and the first BTS 26, to the first mobile station 32. The first mobile station 32 then removes the packet overhead and forwards the print status signal to the computer 120. It should be understood that further messages could be passed between the computer 120 and the printer 122 depending upon the particular printer postscript used.

Although the operation of FIG. 7 is specific to the communications between a computer and a printer using interface apparatus similar to that depicted in FIG. 5, it should be understood that numerous different embodiments could be implemented in a similar fashion. For instance, the first mobile station 32 could be a computer 120 installed with a 3G wireless network modem while the second mobile station 34 is still an interface apparatus coupled to the printer 122. Further, the interface apparatus of FIG. 5 could be used to link a different device that has a USB port or in the case that a different interfacing standard is used, a device that has a port specific for that interfacing standard. In this case, the component interface port 112 within the interface apparatus 106 would be modified for the specific standard utilized.

For example, interface apparatus according to one embodiment comprise component interface ports 112 based on an interface standard used between gaming devices. This embodiment allows a VPN to be established for the communication of gaming operations between a plurality of gaming devices that are not physically local to each other; thus allowing for multi-player game operations without physical connections between the actual gaming devices. In another example, the interface apparatus 106 could be coupled via an interfacing cable to a digital camera that sends images in a digital image format to another component via the interface apparatus 106 and a wireless network. In yet further examples, the interface apparatus 106 could be modified to connect other components to a wireless network such as dispensing machines and remote controls.

Yet further, although the interface apparatus 106 is described as a separate device, it should be understood that it could be implemented within a particular device such as a printer or scanner. In this embodiment, application specific components could be used and/or components within the particular device could be modified in order to gain the functionality required.

The above sample operations are all specific to WVPNs in which all of the nodes of the VPN are mobile stations within the same cell cluster. As described herein above, some VPNs according to embodiments of the present invention have a combination of wireless and wired nodes. Further, some VPNs according to embodiments of the present invention have wireless nodes within different cell clusters. There are specific adjustments that must be made in order to implement these modified embodiments as are described herein below.

Figure 8:
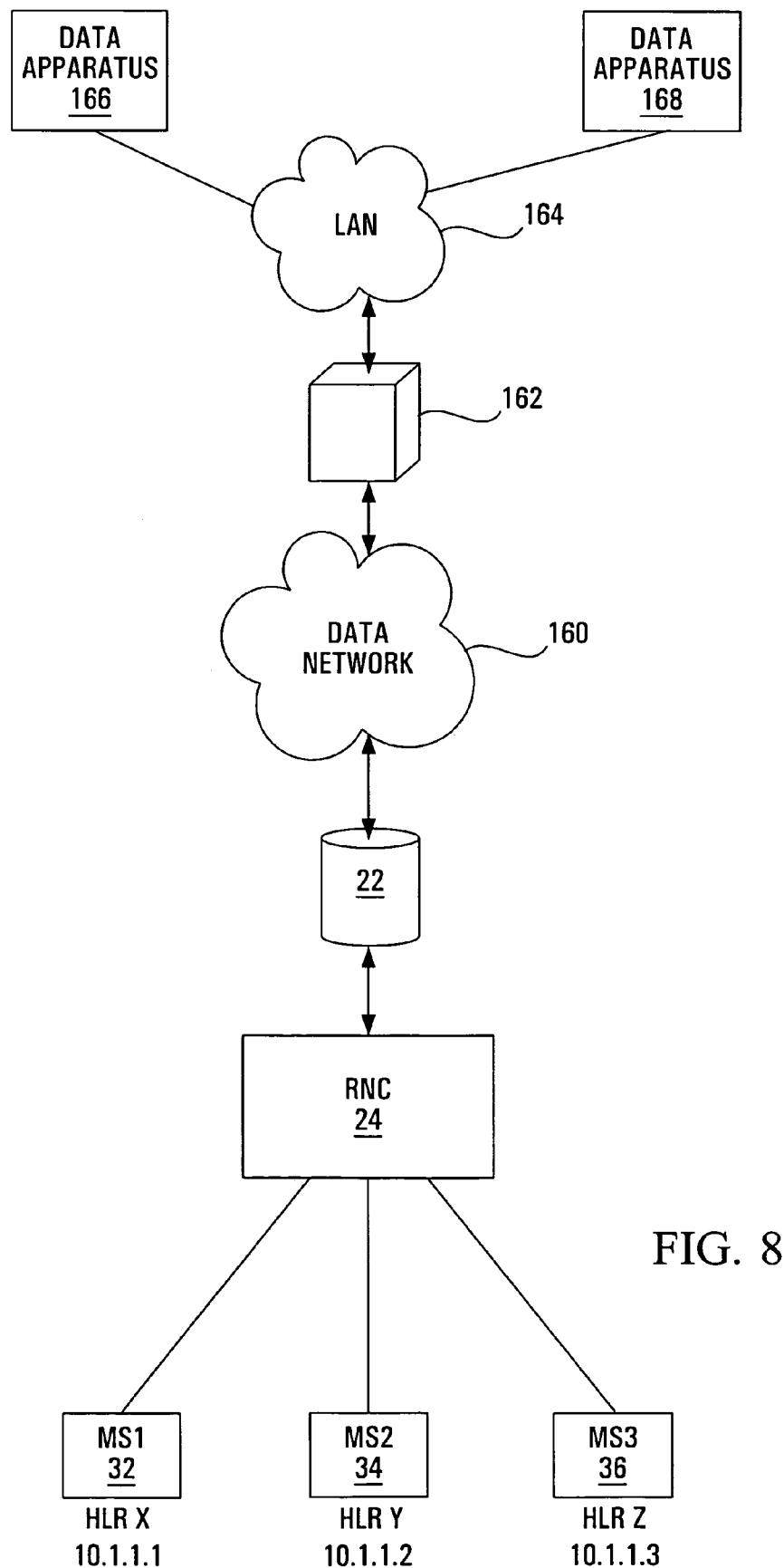
FIG. 8 is a logical block diagram illustrating a VPN according to embodiments of the present invention encompassing both a WVPN and a Local Area Network (LAN)

FIG. 8 is a logical block diagram illustrating one sample embodiment of a VPN in which a mix of wireless and wired nodes are included. This figure includes the logical block diagram of FIG. 2 but with additional elements. Coupled to the intelligent peripheral 22 is a data network 160 that is preferably an IP network such as the Internet. Further coupled to the data network 160 is a web-based server 162 that is further coupled to a Local Area Network (LAN) 164. As seen in FIG. 8, first and second data apparatus are coupled to the LAN 164, the data apparatus 166,168 possibly being computers, printers, and/or scanners. It should be understood that more or less than two data apparatus could be included within an LAN such as the LAN 164.

In the sample embodiment of FIG. 8, the intelligent peripheral 22 preferably includes a first private network group table and the web-based server 162 preferably includes a second private network group table; these two tables together allowing for the establishment of a VPN between the first, second and third mobile stations 32,34,36 and the first and second data apparatus 166,168. FIGS. 9A and 9B illustrate possible implementations for the first and second private network group tables respectively that could be used within the intelligent peripheral 22 and the web-based server 162 respectively of FIG. 8. These private network group tables preferably each include entries for each of the nodes (mobile stations and data apparatus) of the VPN; each entry comprising a node registration and a data address. The data address is preferably the unique IP address assigned to a particular node. The node registration, on the other hand, is preferably the identification used to route data packets through the VPN.

Within the first private network group table of FIG. 9A, the node registrations for the mobile stations 32,34,36 are the HLRs corresponding to the mobile stations while the node registration for both the data apparatus 166,168 is the IP address of the web-based server 162, in this case 10.1.2.0. In the case of the mobile stations 32,34,36, their HLRs are used by the intelligent peripheral 22 when forwarding packets that have their IP address as the destination address. In the case of the data apparatus 166,168, a second IP header having a destination address of the IP address of the web-based server 162 is preferably attached to packets that have either of the data apparatus' IP addresses as the destination address. These packets with two IP encapsulations are then preferably forwarded to the web-based server 162 via the data network 160, at which point the second IP header is removed and the original packet is processed at the web-based server 162.

The use of the second private network group table of FIG. 9B is similar to that described above for the first table but in opposite functionality. Within the second private network group table, the node registrations for all of the mobile stations 32,34,36 is the IP address of the intelligent peripheral 22, in this case 10.1.1.0, while the node registration for the data apparatus 166,168 is the internal address of the particular apparatus, in this case their particular IP addresses. In the case of the data apparatus 166,168, their IP addresses are used by the server 162 when forwarding packets that have their IP address as the destination address. In the case of the mobile stations 32,34,36, a second IP header including the IP address of the intelligent peripheral 22 is preferably attached to packets that have one of the mobile stations' IP addresses as the destination address. These packets with two IP encapsulations are then preferably forwarded to the intelligent peripheral 22 via the data network 160, at which point the second IP header is removed and the original packet is processed at the intelligent peripheral 22.

Within the sample embodiment of FIG. 8, the intelligent peripheral 22 and the web-based server 162 determine whether two apparatus are within the same VPN with use of the node registrations. When a packet arrives, it is determined whether the node registration corresponding to its destination address is within the same private network group table as the originating node's node registration. If a packet was forwarded to the intelligent peripheral 22 from one of the mobile stations within its cell cluster, the HLR of the particular mobile station is used as the originating node's node registration. If a packet was forwarded to the web-based server 162 from one of the data apparatus within its LAN, the IP address of the particular data apparatus is used as the originating node's node registration. If a packet was forwarded to either the server 162 or the peripheral 22 from another web-based server or intelligent peripheral, the IP address of the originating server/peripheral is used as the originating node's node registration.

In this configuration an intelligent peripheral or a web-based server can support more than one private network group table at one time. As such, each web-based server and intelligent peripheral must have distinct IP addresses assigned for each private network group that it supports.

The sample embodiment of FIG. 8 is not limited to the case of a single intelligent peripheral 22 and a single web-based server 162. This embodiment could be expanded to include a plurality of both components or simply a plurality of one type of component and none of the other. It should also be recognized, in the case that the VPN is a WVPN with all of its nodes being mobile stations within a variety of different cell clusters, there are alternatives to the use of a data network such as data network 160 to interconnect them. For instance, the interconnections of the intelligent peripherals for each cell cluster could occur via the interconnection of their respective MSCs, that being with use of Custom Local Area Signalling Services (CLASS) such as SS7 signalling.

There are numerous alternative embodiments to those described herein above. For one, a different wireless standard to the IMT-2000 standard defined by the ITU could be utilized as long as it has the minimum functionality required to operate the present invention. In other standards, another component other than the RNC could be used to control the adjusting of bandwidths between mobile stations and BTSs.

Another alternative embodiment of the present invention has the private network group tables stored within a different device than the intelligent peripheral. In one embodiment in which there are nodes within one or more cell clusters and/or one or more LANS, the private network group table is in a central device that all routing for the VPN traverses. This central table regulates the VPN to ensure that only nodes within the VPN can access other nodes.

There are a number of other limitations that were suggested in the sample operations described above that should not limit the scope of the overall present invention. For one, it should be understood that a mobile station or other apparatus could be part of more than one VPN by simply being a member of more than one private network group table. As well, although the operations herein above describe cases in which a first mobile station can only access a second mobile station if they are both within the same VPN, some embodiments of the present invention would further allow the first mobile station to access other mobile stations or apparatus that are not specifically part of the VPN, such as an Internet server. This would allow a user of a computer within a VPN to access the other devices not within the VPN as well as possibly the public Internet. This embodiment would preferably be implemented with use of a well-known firewall within the intelligent peripheral 22.

In yet further alternatives, the intelligent peripheral 22 determines whether data information is of a type that requires a limited access and, if the particular data information does not require limited access, processes the data information (i.e. forwards it) without regard to whether the sending and receiving mobile stations are within the same private network group. In the case that limited access is required, one should understand that the operation of the intelligent peripheral 22, as described above, would result. The operation of the intelligent peripheral 22, in this case, can be seen as enabling communication between only mobile stations that are both within the same virtual private network group or as disabling all communication between mobile stations that are not both within the same private network group.

Even further, although the description herein above is directed to the transfer of data information from apparatus to apparatus via a VPN, it should be understood that this data could be voice over IP packets or other packet-based units designed to carry voice signals over a data network. In general, the data information being transferred from apparatus to apparatus can be referred to as data units, these data units possibly being defined by one of a number of standards. Internet Protocol (IP) packets and Asynchronous Transfer Mode (ATM) cells are two example implementations of possible data units.

The present invention overall allows a large number of the advantages of a wired network design to be available to users in a wireless environment. For one, members of the mobile workforce using embodiments of the present invention can more easily use simple networking features such as email, uploading and/or downloading information, using a central server to share files, backup operations, and shared apparatus such as printers and scanners. Further, the VPN implementation according to embodiments of the present invention could be used to remove the large wired networks that are typically within an enterprise, thus making reconfiguration during the addition/removal of components much easier.

Persons skilled in the art will appreciate that there are yet more alternative implementations and modifications possible for implementing the present invention, and that the above implementation is only an illustration of this embodiment of the invention. The scope of the invention, therefore, is only to be limited by the claims appended hereto.

We claim:

1. An apparatus for controlling data unit communications between a plurality of mobile stations, the apparatus comprising:

means for grouping at least two of the plurality of mobile stations as members of a private network group, each of the at least two mobile stations having a respective maintained communication link with the apparatus that is independent of the respective maintained communication link of the other of the at least two mobile stations and, once established, is maintained throughout a session;

means for determining if a first mobile station sending a data unit and a second mobile station scheduled to receive the data unit are both members of the private network group; and means for enabling communication of the data unit from the first mobile station to the second mobile station through the respective maintained communication links of the first mobile station and the second mobile station only if they are both members of the private network group.

2. The apparatus according to claim 1, wherein each of the mobile stations has a corresponding Home Location Registration (HLR);

wherein the means for grouping at least two of the plurality of mobile stations as members of the private network group comprises means for listing the HLRs of the at least two mobile stations within a private network group table; and wherein the means for determining if the first and second mobile stations are both members of the private network group comprises means for determining if the HLRs of the first and second mobile stations are both listed within the private network group table.

3. The apparatus according to claim 2, wherein each of the mobile stations further has a corresponding data address and the data unit includes a data address corresponding to a desired destination mobile station as a destination address;

wherein the means for grouping at least two of the plurality of mobile stations as members of a private network group further comprises means for listing the data addresses of the at least two mobile stations within the private network group table corresponding to their HLRs; and wherein the means for determining if the first and second mobile stations are both members of the private network group further comprises means for determining the HLR of the second mobile station by looking-up the destination address of the data unit within the private network group table.

4. The apparatus according to claim 3, wherein the data addresses are Internet Protocol (IP) addresses.

5. The apparatus according to claim 1, wherein each of the mobile stations has a corresponding node registration;

wherein the means for grouping at least two of the plurality of mobile stations as members of a private network group comprises means for listing the node registrations of the at least two mobile stations within a private network group table; and wherein the means for determining if the first and second mobile stations are both members of the private network group comprises means for determining if the node registrations of the first and second mobile stations are both listed within the private network group table.

6. The apparatus according to claim 5, wherein the plurality of mobile stations comprises a first set of at least one mobile station within a first cell cluster and a second set of at least one mobile station within a second cell cluster, the node registrations corresponding to the mobile stations of the first set being respective Home Location Registrations (HLRs) and the node registrations corresponding to the mobile stations of the second set all being a data address corresponding to a second apparatus; and wherein the apparatus for controlling data unit communications further comprises means for adding a header to the data unit if the apparatus determines that the first and second mobile stations are both members of the private network group and the second mobile station has a data address corresponding to the second apparatus as its node registration, the header comprising the data address corresponding to the second apparatus as a destination address.

7. The apparatus according to claim 6, wherein the data address corresponding to the second apparatus is an Internet Protocol (IP) address.

8. The apparatus according to claim 1 further comprising means for determining if the data unit is of a type requiring limited access, and means for enabling communication of the data unit from the first mobile station to the second mobile station if the data unit is not of the type requiring limited access, even if the first and second mobile stations are not both members of the private network group.

9. The apparatus according to claim 1 further comprising means for sending a bandwidth request signal prior to enabling communication of the data unit if the second mobile station has insufficient bandwidth capabilities to receive the data unit on the respective maintained communication link of the second mobile station.

10. The apparatus according to claim 1 further comprising means for sending an error signal to the first mobile station if the first and second mobile stations are not both members of the private network group.

11. An apparatus for controlling data unit communications between a plurality of mobile stations, the apparatus comprising:
- means for grouping at least two of the plurality of mobile stations as members of a private network group, each of the at least two mobile stations having a respective maintained communication link with the apparatus that is independent of the respective maintained communication link of the other of the at least two mobile stations and, once established, is maintained throughout a session;
- means for determining if a first mobile station sending a data unit and a second mobile station scheduled to receive the data unit are both members of the private network group; and
- means for disabling communication of the data unit from the first mobile station to the second mobile station through the respective maintained communication links of the first mobile station and the second mobile station if they are not both members of the private network group.

12. An apparatus for controlling data unit communications between a first set of at least one mobile telephone station and a second set of at least one fixed wire telephone station, the apparatus comprising:
- means for grouping at least two telephone stations of said first set of at least one mobile telephone station and said second set of at least one fixed wire telephone station as members of a private network group, at least one of the at least two telephone stations being a mobile telephone station, each of the at least one mobile telephone station of the private network group having a respective maintained communication link with the apparatus that is independent of the respective maintained communication link of any other mobile telephone station of the private network group and, once established, is maintained throughout a session;
- means for determining if a first telephone station sending a data unit and a second telephone station scheduled to receive the data unit are both members of the private network group; and
- means for enabling communication of the data unit from the first telephone station to the second telephone station, through the respective maintained communication link of the first telephone station if the first telephone station is a mobile telephone station, through the respective maintained communication link of the second telephone station if the second telephone station is a mobile telephone station, and through the respective maintained communication links of the first and second telephone stations if they are both mobile telephone stations, only if they are both members of the private network group.

13. The apparatus according to claim 12, wherein each of the at least one mobile telephone station and the at least one fixed wire telephone station has a corresponding node registration;
- wherein the means for grouping at least two telephone stations of said first set of at least one mobile telephone station and said second set of at least one fixed wire telephone station as members of a private network group comprises means for listing the node registrations of the at least two telephone stations within a private network group table; and
- wherein the means for determining if the first and second telephone stations are both members of the private network group comprises means for determining if the node registrations of the first and second telephone stations are both listed within the private network group table.

14. The apparatus according to claim 13, wherein the node registration for the at least one mobile telephone station of the first set is a Home Location Registration (HLR) corresponding to the at least one mobile telephone station of the first set.

15. The apparatus according to claim 13, wherein the node registration for the at least one fixed wire telephone station of the second set is a data address corresponding to a second apparatus coupled to the at least one fixed wire telephone station.

16. The apparatus according to claim 13, wherein the means for enabling communication of the data unit from the first telephone station to the second telephone station comprises means for attaching a header to the data unit, the header comprising a data address corresponding to a second apparatus coupled to the second telephone station as a destination address; and means for outputting a resulting data unit to a data network for routing.

17. The apparatus according to claim 15, wherein the data address corresponding to the second apparatus is an Internet Protocol (IP) address.

18. The apparatus according to claim 16, wherein the second apparatus is a server coupled to a Local Area Network (LAN).

19. The apparatus according to claim 13, wherein each of the at least one mobile telephone station and the at least one fixed wire telephone station further has a corresponding data address and the data unit includes a data address corresponding to a desired destination mobile station as a destination address;
- wherein the means for grouping at least two telephone stations of said first set of at least one mobile telephone station and said second set of at least one fixed wire telephone station as members of a private network group further comprises means for listing the data addresses of the at least two telephone stations within the private network group table corresponding to their node registrations; and
- wherein the means for determining if the first and second telephone stations are both members of the private network group further comprises means for determining the node registration of the second telephone station by looking-up the destination address of the data unit within the private network group table.

20. The apparatus according to claim 19, wherein the data addresses are Internet Protocol (IP) addresses.

21. The apparatus according to claim 12 further comprising means for determining if the data unit is of a type requiring limited access, and means for enabling communication of the data unit from the first telephone station to the second telephone station if the data unit is not of the type requiring limited access, even if the first and second telephone stations are not both members of the private network group.

22. A private network comprising:
- a data network;
- a plurality of sets, each set including at least one telephone station; and
- a plurality of apparatus coupled to the data network, each of the apparatus comprising:
  - means for grouping at least two telephone stations of the plurality of sets as members of a private network group, each of the at least two telephone stations of the private network group having a respective maintained communication link with a respective one of the apparatus that is independent of the respective maintained communication link of the other of the at least two telephone stations and, once established, is maintained throughout a session;

means for determining if a first telephone station of the plurality of sets that maintains a respective communication links with a first one of the plurality of apparatus and is sending a data unit, and a second telephone station of the plurality of sets that maintains a respective communication links with a second one of the plurality of apparatus and is scheduled to receive the data unit are both members of the private network group; and means for enabling communication of the data unit from the first telephone station, via the data network, to the second telephone station through the respective maintained communication links of the first telephone station and the second telephone station only if the first and second telephone stations are both members of the private network group.

23. The private network according to claim 22, wherein each of the telephone stations within the private network group has a corresponding node registration;

wherein the means for grouping at least two of the plurality of telephone stations as members of a private network group comprises means for listing the node registrations of the at least two telephone stations within a private network group table; and wherein the means for determining if the first and second telephone stations are both members of the private network group comprises means for determining if the node registrations of the first and second telephone stations are both listed within the private network group table.

24. The private network according to claim 23, wherein first and second ones of the plurality of sets comprises first and second sets of mobile stations respectively that are located within respective first and second cell clusters, the first and second sets being coupled to the first and second ones of the plurality of apparatus;

wherein, within the first apparatus, the node registrations corresponding to the mobile stations of the first set are respective Home Location Registrations (HLRs) and the node registrations corresponding to the mobile stations of the second set are a data address corresponding to the second apparatus; and wherein, within the second apparatus, the node registrations corresponding to the mobile stations of the second set are respective HLRs and the node registrations corresponding to the mobile stations of the first set are a data address corresponding to the first apparatus.

25. The private network according to claim 22, wherein the means for enabling communication of the data unit from the first telephone station to the second telephone station comprises means for attaching a header to the data unit, the header comprising a data address corresponding to the second telephone station as a destination address; and means for outputting the resulting data unit to the data network for routing.

26. The private network according to claim 22, wherein at least one of the plurality of apparatus is an intelligent peripheral in communication with a third generation wireless network.

27. The private network according to claim 22, wherein at least one of the plurality of apparatus is a server coupled to a Local Area Network (LAN).

28. A wireless network comprising:
an apparatus;
a radio network controller coupled to the apparatus;
at least one base transceiver station coupled to the radio network controller; and
a plurality of mobile stations;
wherein the apparatus comprises:
means for grouping at least two of the plurality of mobile stations as members of a private network group, each of the at least two mobile stations of the private network group having a respective maintained communication link with one of the at least one base transceiver station that is independent of the respective maintained communication link of the other of the at least two mobile stations and, once established, is maintained throughout a session;

means for determining if a first mobile station sending a data unit and a second mobile station scheduled to receive the data unit are both members of the private network group; and means for enabling communication of the data unit from the first mobile station to the second mobile station through the respective maintained communication links of the first mobile station and the second mobile station only if they are both members of the private network group.

29. The wireless network according to claim 28, wherein the radio network controller comprises means for adjusting a bandwidth between each of the mobile stations and its respective one of the at least one base transceiver station.

30. The wireless network according to claim 28 further comprising a mobile switching center in communication with the apparatus and the radio network controller, the mobile switching center comprising means for controlling the switching operations of the wireless network within a predefined cell cluster.

31. The wireless network according to claim 28, wherein at least one of the mobile stations comprises a personal computer with a wireless modem.

32. The wireless network according to claim 28, wherein at least one of the mobile stations comprises an interface apparatus arranged to be coupled to a digital data processing component and arranged to maintain a communication link with one of the at least one base transceiver station, the interface apparatus comprising:

an interface port comprising means for receiving digital data in a first format from the digital data processing component, means for converting the digital data from the first format to a second format, and means for outputting the digital data in the second format;

a computing device, coupled to the interface port, comprising means for receiving the digital data in the second format from the interface port; means for attaching a data unit overhead including source and destination addresses to the received digital data in order to generate the data unit, the source address being a predefined data address for the interface apparatus and the destination address being a stored data address; and means for outputting the data unit; and a wireless network transceiver, coupled to the computing device, comprising means for receiving the data unit and means for transmitting it to the base transceiver station.

33. The wireless network according to claim 32, wherein the interface port is a Universal Serial Bus (USB) port and the first format is a format required for transmitting the digital data over a USB cable.

34. The wireless network according to claim 28, wherein at least one of the plurality of mobile stations comprises an interface apparatus arranged to be coupled to a digital data processing component and arranged to maintain a communication link with one of the at least one base transceiver station, the interface apparatus comprising:
- a wireless network transceiver comprising means for receiving the data unit from the base transceiver station, with the data unit comprising digital data in a first format and a data unit overhead including source and destination addresses, the destination address being a predefined data address for the interface apparatus, and means for outputting the data unit;
- a computing device, coupled to the wireless network transceiver, comprising means for receiving the data unit from the wireless network transceiver, means for removing the data unit overhead from the data unit, and means for outputting the digital data in the first format; and
- an interface port, coupled to the computing device, comprising means for receiving the digital data in the first format, means for converting the received digital data from the first format to a second format, and means for outputting the digital data in the second format to the digital data processing component.

35. The wireless network according to claim 34, wherein the interface port is a Universal Serial Bus (USB) port and the second format is a format required for transmitting the digital data over a USB cable.

36. Within a network comprising a plurality of mobile stations, a method of enabling communication of a data unit from a first mobile station of said plurality of mobile stations to a second mobile station of said plurality of mobile stations, the method comprising:
- grouping at least two of the plurality of mobile stations as members of a private network group, each of the at least two mobile stations of the private network group having a respective maintained communication link with a respective base transceiver station that is independent of the respective maintained communication link of the other of the at least two mobile stations and, once established, is maintained throughout a session;
- determining if the first mobile station sending the data unit and the second mobile station scheduled to receive the data unit are both members of the private network group; and
- enabling communication of the data unit from the first mobile station to the second mobile station through the respective maintained communication links of the first mobile station and the second mobile station only if they are both members of the private network group.

37. The method according to claim 36, wherein:
- each of the mobile stations has a corresponding Home Locations Registration (HLR);
- the grouping of at least two of the plurality of mobile stations as members of a private network group comprises listing the HLRs of the at least two mobile stations within a private network group table; and
- the determining if the first and second mobile stations are both members of the private network group comprises determining if the HLRs of the first and second mobile stations are both listed within the private network group table.

38. The method according to claim 36, wherein:
- each of the mobile stations has a corresponding node registration;
- the grouping of at least two of the plurality of mobile stations as members of a private network group comprises listing the node registrations of the at least two mobile stations within a private network group table; and
- the determining if the first and second mobile stations are both members of the private network group comprises determining if the node registrations of the first and second mobile stations are both listed within the private network group table.

39. The method according to claim 36, further comprising:
- determining if the data unit is of a type requiring limited access; and
- enabling communication of the data unit from the first mobile station to the second mobile station if the data unit is not of the type requiring limited access, even if the first and second mobile stations are not both members of the private network group.

40. A method for controlling data unit communications between a plurality of mobile stations in a network comprising:
- enabling grouping of at least two of the plurality of mobile stations as members of a private network group, each of the at least two mobile stations of the private network group having a respective maintained communication link that is independent of the respective maintained communication link of the other of the at least two mobile stations and, once established, is maintained throughout a session;
- enabling determination of whether a first mobile station and a second mobile station are members of the private network group; and
- enabling communication of data units from the first mobile station to the second mobile station through the maintained communication links of the first mobile station and the second mobile station.

41. The method according to claim 40, wherein:
- each of the mobile stations has a corresponding Home Location Registration (HLR);
- the enabling grouping of at least two of the plurality of mobile stations as members of a private network group comprises enabling listing of the HLRs of the at least two mobile stations within a private network group table; and
- the enabling determination of whether a first mobile station and a second mobile station are members of the private network group comprises enabling determination of whether the HLRs of the first and second mobile stations are both listed within the private network group table.

42. The method according to claim 40, wherein:
- each of the mobile stations has a corresponding node registration;
- the enabling grouping of at least two of the plurality of mobile stations as members of a private network group comprises enabling listing of the node registrations of the at least two mobile stations within a private network group table; and
- the enabling determination of whether a first mobile station and a second mobile station are members of the private network group comprises enabling determination of whether the node registration of the first and second mobile stations are both listed within the private network group table.

43. The method according to claim 40, further comprising:
- enabling determination of whether the data unit is of a type requiring limited access; and
- enabling communication of the data unit from the first mobile station to the second mobile station if the data unit is not of the type requiring limited access, even if the first and second mobile stations are not both members of the private network group.

44. An apparatus for controlling data packet communications between a plurality of mobile stations, the apparatus comprising:
- means for establishing a private network by establishing a respective maintained communication link between the apparatus and each of at least two of the plurality of mobile stations that is independent of the respective maintained communication link of the other of the at least two mobile stations and, once established, is maintained throughout a session;
- means for receiving data packets from members of the private network group, each packet having a source and a destination; and
- means for enabling communication that for each packet received:
  - determines if the source and destination both belong to the private network; and
  - forwards the packet to the destination only if the source and destination both belong to the private network.

45. An apparatus for controlling data unit communication in a private network group comprising a plurality of mobile stations, the apparatus comprising:
- a private network group manager that groups at least two mobile stations of the plurality as members of the private network group, each of the at least two mobile stations having a respective maintained communication link with the apparatus that is independent of the respective maintained communication link of the other of the at least two mobile stations and, once established, is maintained throughout a session;
- a private network group identifier that determines if a first mobile station sending a data unit and a second mobile station scheduled to receive the data unit are both members of the private network group; and
- a communication controller that enables communication of the data unit from the first mobile station to the second mobile station through the respective maintained communication links of the first mobile station and the second mobile station only if they are both members of the private network group.

46. The apparatus according to claim 45, wherein the respective maintained communication links of the members of the private network comprise variable bandwidth communication links.

47. The apparatus according to claim 45, wherein:
- each of the mobile stations of the plurality of mobile stations has a corresponding Home Location Registration (HLR);
- the private network group manager lists the HLRs of the at least two mobile stations within a private network group table in order to group the at least two mobile stations of the plurality of mobile stations as members of the private network group; and
- the private network group identifier determines if the HLRs of the first and second mobile stations are both listed within the private network group table to determine if the first and second mobile stations are both members of the private network group.

48. The apparatus according to claim 47, wherein:
- each of the mobile stations further has a corresponding data address and the data unit includes a data address corresponding to a desired destination mobile station as a destination address;
- the private network group manager lists the data addresses of the at least two mobile stations within the private network group table corresponding to their HLRs; and
- the private network group identifier determines the HLR of the second mobile station by looking-up the destination address of the data unit within the private network group table.

49. The apparatus according to claim 48, wherein the data addresses are Internet Protocol (IP) addresses.

50. The apparatus according to claim 45, wherein:
- each of the mobile stations has a corresponding node registration;
- the private network group manager lists the node registrations of the at least two mobile stations within a private network group table in order to group the at least two mobile stations as members of the private network group; and
- the private network group identifier determines if the node registrations of the first and second mobile stations are both listed within the private network group table to determine if the first and second mobile stations are both members of the private network group.

51. The apparatus according to claim 50, wherein the plurality of mobile stations comprises a first set of at least one mobile station within a first cell cluster and a second set of at least one mobile station within a second cell cluster, the node registrations corresponding to the mobile stations of the first set being respective Home Location Registrations (HLRs) and the node registrations corresponding to the mobile stations of the second set all being a data address corresponding to a second apparatus; and
- wherein the apparatus for controlling data unit communications further comprises a data unit processor that adds a header to the data unit if the private network group identifier determines that the first and second mobile stations are both members of the private network group and the second mobile station has a data address corresponding to the second apparatus as its node registration, the header comprising the data address corresponding to the second apparatus as a destination address.

52. The apparatus according to claim 51, wherein the data address corresponding to the second apparatus is an Internet Protocol (IP) address.

53. The apparatus according to claim 45, further comprising:
- a data unit processor that determines if the data unit is of a type requiring limited access, wherein
- the communication controller enables communication of the data unit from the first mobile station to the second mobile station if the data unit is not of the type requiring limited access, even if the first and second mobile stations are not both members of the private network group.

54. The apparatus according to claim 45, wherein the communication controller sends a bandwidth request signal prior to enabling communication of the data unit if the second mobile station has insufficient bandwidth capabilities to receive the data unit on the respective maintained communication link of the second mobile station.

55. The apparatus according to claim 45, further comprising an error signaler that sends an error signal to the first mobile station if the first and second mobile stations are not both members of the private network group.

* * * * *

UNITED STATES PATENT AND TRADEMARK OFFICE
CERTIFICATE OF CORRECTION

| | | |
|---|---|---|
| PATENT NO. | : 7,486,628 B1 | Page 1 of 1 |
| APPLICATION NO. | : 09/466124 | |
| DATED | : February 3, 2009 | |
| INVENTOR(S) | : Mitch A. Brisebois et al. | |

It is certified that error appears in the above-identified patent and that said Letters Patent is hereby corrected as shown below:

Column 1, line 5, --...etitled...-- should read "...entitled...";
Column 21, line 8, --...communication links...-- should read "...communication link..."; and
Column 21, line 11, --...communication links...-- should read "...communication link...".

Signed and Sealed this

Fifth Day of May, 2009

JOHN DOLL
*Acting Director of the United States Patent and Trademark Office*